(12) United States Patent
Pérez (10) Patent No.: US 8,500,020 B2
(45) Date of Patent: Aug. 6, 2013

(54) WRITING AND READING DATA SYSTEM, STARTING FROM A CHROMATIC PRINTED INFORMATION THAT MODIFIES PATTERNS EMITED BY AN ELECTROMAGNETIC WAVES SOURCE, INTRODUCING BIASES THAT CONFORM NEW PATTERNS, GIVING PLACE TO NEW DATA CATEGORIES MATCHED TO A CODE

(76) Inventor: Agustín Jóse Luis Pérez, Buenos Aires (AR)

( * ) Notice: Subject to any disclaimer, the term of this patent is extended or adjusted under 35 U.S.C. 154(b) by 1722 days.

(21) Appl. No.: 11/749,324

(22) Filed: May 16, 2007

(65) Prior Publication Data

US 2007/0280698 A1    Dec. 6, 2007

(51) Int. Cl.
*G06K 7/10* (2006.01)
(52) U.S. Cl.
USPC .............................. 235/454; 235/380; 235/491
(58) Field of Classification Search
USPC .......................................... 235/454, 380, 491
See application file for complete search history.

(56) References Cited

U.S. PATENT DOCUMENTS

| | | | | |
|---|---|---|---|---|
| 4,446,204 | A * | 5/1984 | Kaule et al. | 428/323 |
| 5,522,623 | A | 6/1996 | Soules et al. | |
| 2002/0057852 | A1 | 5/2002 | Durbin et al. | |
| 2005/0067489 | A1 | 3/2005 | Jones et al. | |
| 2007/0171492 | A1 * | 7/2007 | Downing et al. | 359/3 |

FOREIGN PATENT DOCUMENTS

| | | |
|---|---|---|
| EP | 1 457 916 A | 9/2004 |
| GB | 1 371 254 A | 10/1974 |
| GB | 1 424 442 A | 2/1976 |
| GB | 1 534 403 A | 12/1978 |
| GB | 2 272 861 A | 6/1994 |
| GB | 2 372 232 A | 8/2002 |
| WO | 90/00980 A | 2/1990 |
| WO | 02/070279 A | 9/2002 |
| WO | 2005/035271 A | 4/2005 |

* cited by examiner

*Primary Examiner* — Allyson Trail
(74) *Attorney, Agent, or Firm* — Ladas & Parry LLP (57) ABSTRACT

The present invention allows setting information into a support (paper, cardboard, plastics, etc.) by printing process or different kinds of chromatic settings (like chemical reactions),which could be read and decoded in controlled and repetitive conditions, matching with a known code. The process makes it possible the production of a low cost and high security level data support, due to the impossibility of visual access to the information. At the time, the system presents strong barrier for going through the information by means of other technological resources (of optical nature, for example) due to the impossibility of knowing the chromatic parameters settings involved in the scanning procedure for each cluster, which can change from one bit to another one. At the same time, the physical access results also impossible because of the destruction of the support that would be done in the will of doing it. The data clusters are characterized by the particular bias introduced at the constitutive patterns of the electromagnetic waves projected through the chromatic deposits at the molecular level of the support, which read by a proper scanner are after processed and assigned to data categories. Those inputs categories, finally produce outputs for interfaces and external requirements.

14 Claims, 10 Drawing Sheets

WRITING AND READING DATA SYSTEM, STARTING FROM A CHROMATIC PRINTED INFORMATION THAT MODIFIES PATTERNS EMITED BY AN ELECTROMAGNETIC WAVES SOURCE, INTRODUCING BIASES THAT CONFORM NEW PATTERNS, GIVING PLACE TO NEW DATA CATEGORIES MATCHED TO A CODE

FIELD OF THE INVENTION

The present invention relates to a recording and reading data system, in which is codified data are set in a variety of supports (cards, tickets, vouchers, notes, etc.) made of different materials (paper, Bristol board, plastic, rubber, and many others). That information becomes inaccessible to the human sight and, due to it's particular conditions of production, impossible to access unless by destroying or causing damages to the support, and therefore to the proper information, making impossible duplication or cloning. This system provides improved security levels.

The recording and reading processes are characterized by the low cost of production.

BACKGROUND OF THE INVENTION

Nowadays there are many recording and reading solutions for the data cards market (smart cards, RFID cards, magnetic cards, bar code, etc), and although not part of the electronically read universe, there are also scratch-off cards which are used for hiding information.

Such modalities are either high in cost or have poor performance others, allowing counterfeit and cloning.

This invention, instead, provides a data support solution for those markets and applications, providing lower cost and higher standards of security.

SUMMARY OF THE INVENTION

According to the present invention there is provided a system in which coded data are stored on a medium by use by depositing material having chromatic properties on or incorporating it into the medium and such data are read by passing electromagnetic radiation through said medium or reflecting such radiation from such a medium and wherein the waveform of the radiation is modified by interaction with said material having chromatic properties.

The present invention is a very high security data storage system, which, by means of a process for setting chromatic pattern clusters (that can be installed by standard printing resources) into supports made of paper, Bristol-board, plastic, rubber, etc, allows data being set in a very subtle chromatic distribution way, making it impossible the visual detection and the mechanical access to the chromatic patterns (pigmented molecules) installed in a support-layer and being referred to data values. This procedure permits the later detection (reading) of particular characteristics of an electromagnetic wave after its interaction with such chromatic material, given by a convergence of several physical phenomena, such as form changes, harmonic distributions, distortions and variations of absorption indexes at different frequencies exposures, with their consequent impact in the power response of the system, and resonance effects that occurs at the original electromagnetic wave level. Altogether, this such values and biases, are parametrized and performed into a matrix, giving place to a complex data register, and allowing the reference (matching) to a given code of data categories.

Then the result is compared to a pattern registry (a sample) and, this way, if identical, is validated as a genuine data element.

Electromagnetic radiation used for this purpose may be typically in the visible range but can also be for example in the infra red, microwave and ultraviolet regions of the spectrum if suitable chromatic materials are used. Such radiation will normally be at a particular predetermined wave length. When a light source is employed, this may conveniently be a light emitting diode. If desired multiple sources of electromagnetic radiation may be used to "read" different data elements present on the medium. Such sources may be used at different times and their interaction with chromatic clusters evaluated against the same or different sets of parameters resulting from interaction of the electromagnetic radiation and chromatic clusters. In this way, different aspects of data stored on the medium may be read for different purposes.

Suitable chromatic materials for use in the present invention include conventional inks and toners, the effect of which when interacting with electromagnetic radiation of particular waveforms has been determined. The medium to which such clusters may be applied include paper, cardboard, acetate, plastic, plexiglass, acetate, rubber, adhesive tape and fabric. If desired, multiple layers may be used each of which may contain chromatic clusters representing different data elements.

As noted above, interaction of electromagnetic radiation with a cluster of material having chromatic properties may cause variation of a number of different parameters relating to the waveform. The number of parameters that are used to effect verification according to the present invention will be a matter of choice, depending for example on the degree of security required.

The process explained before is repeated for each one of the data elements in the sample, and if only one would not satisfy the matrix comparison requirements (parameters) all the sample will be invalid. The data represented by a chromatic cluster may be stored in any convenient analog or digital form.

The detection process is made, for example by means of photo-electrical transformation, producing a binary or analog output, which is decoded by a proper processing block.

Chromatic deposits on or in the support medium may be effected in any convenient way, for example by printing. Preferably security is enhanced by subtle variation within the deposit thereby resulting in a more complex modification of electromagnetic radiation interacting with the chromatic deposit. Variation within chromatic clusters is effected by use of mixtures of materials having chromatic properties in each chromatic cluster.

Detection of the parameters of the modified waveform is effected in any convenient way, for example by use of transducers and photoelectric cells. Comparison with an authentic set of parameters that have been predetermined for a particular chromatic cluster is then carried out by computer means, for example by use of a microprocessor.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENTS

Figure 1:
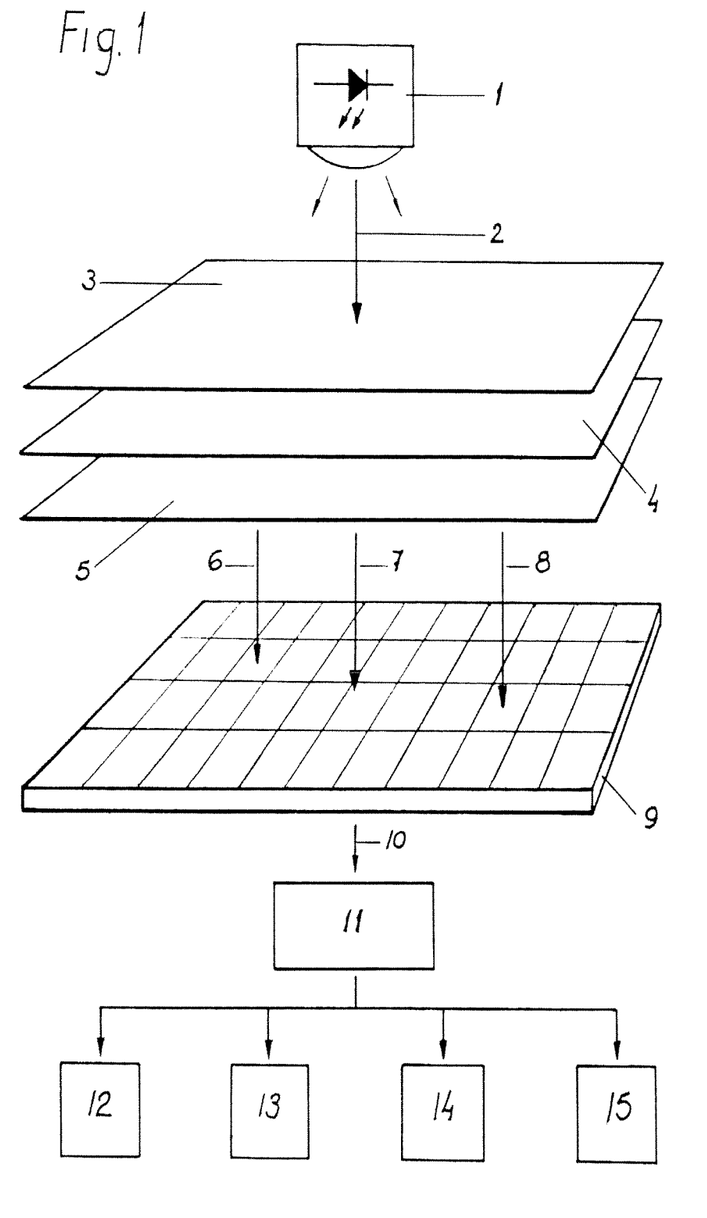
FIG. 1 is a view of the main components of the reading process.

Referring generally to FIG. 1, Starting from an electromagnetic energy source (like light emitter for this example) 1, there are produced a photonic emission set at specific waveform and wavelong values selected among the whole electromagnetic spectrum 2, trespassing a protection layer 3, and going straight to the data layer containing chromatic installations formed in controlled clusters 4.

That clusters, which their molecular deposits, adds information which come from the modification at the original characteristics (waveform and components) at the original photonic emission.

As a result, the emerging beams 6, 7 and 8, due to a distortion modification resulting from interaction with the chromatic deposits processes, contains a new distributions of harmonics giving place to new waveforms, and this way creating a new information registers. Those beams are received by the photoelectric transceiver (scanner) 9, then the output analog information 10 is processed by the microprocessor 11. This module decodes the information, comparing the data to internal data, validating or not each bit, and then and then passing the result to external processing 12, 13, 14 and 15.

Figure 2:
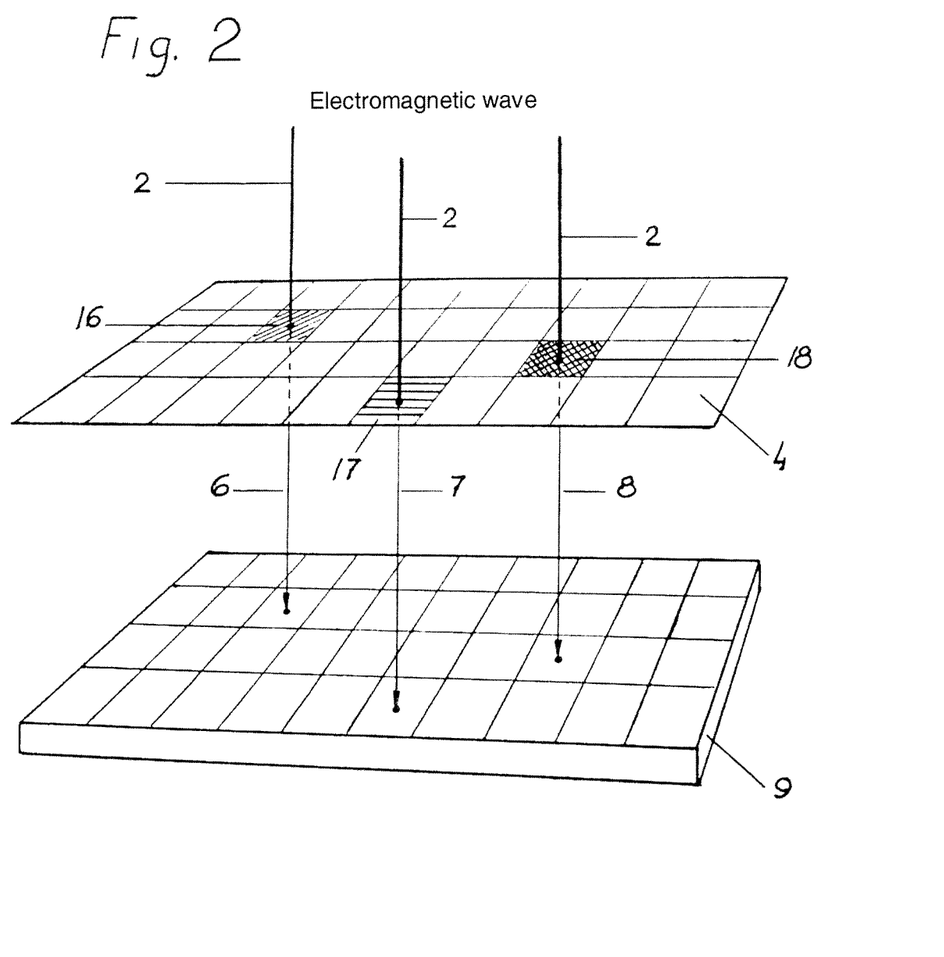
FIG. 2 is a view focused in the data layer of the card and the receiver array. There are shown too the photonic beams.

Referring generally to FIG. 2, a view focused on the data layer 4, with the detail of the chromatic clusters 16, 17 and 18, strikes by the photonic beams 2, which, enriched information 6, 7 and 8, by the clusters data, continues their paths to the transceiver 9.

Figure 3:
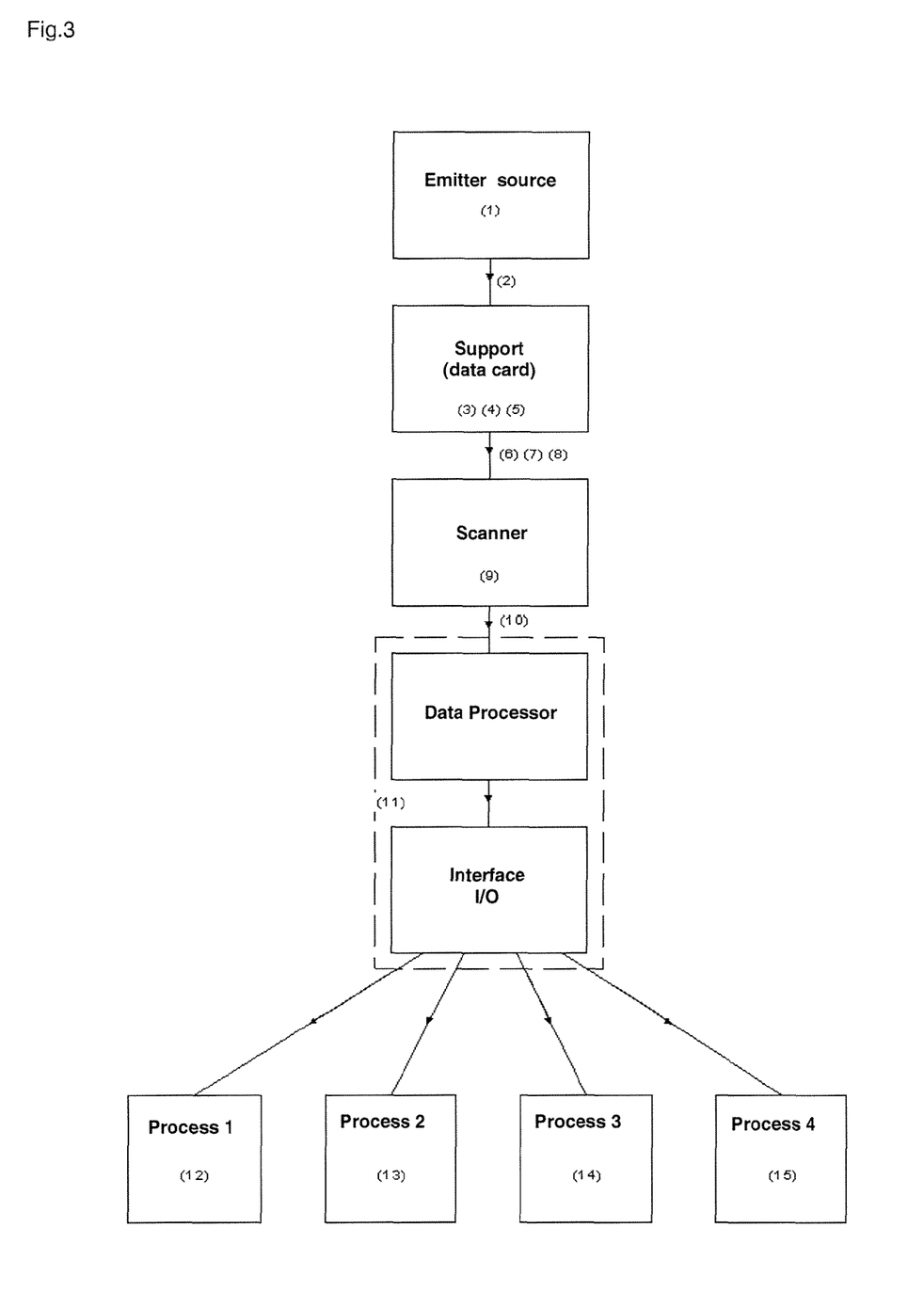
FIG. 3 is a general block diagram which represents the data flows of the whole loop of information, from the source to the output.

Referring generally to FIG. 3, a block diagram is illustrated the flow of information described in the FIG. 1, from the source to the outputs.
(Note: Numbers refers to FIG. 1)

Figure 4:
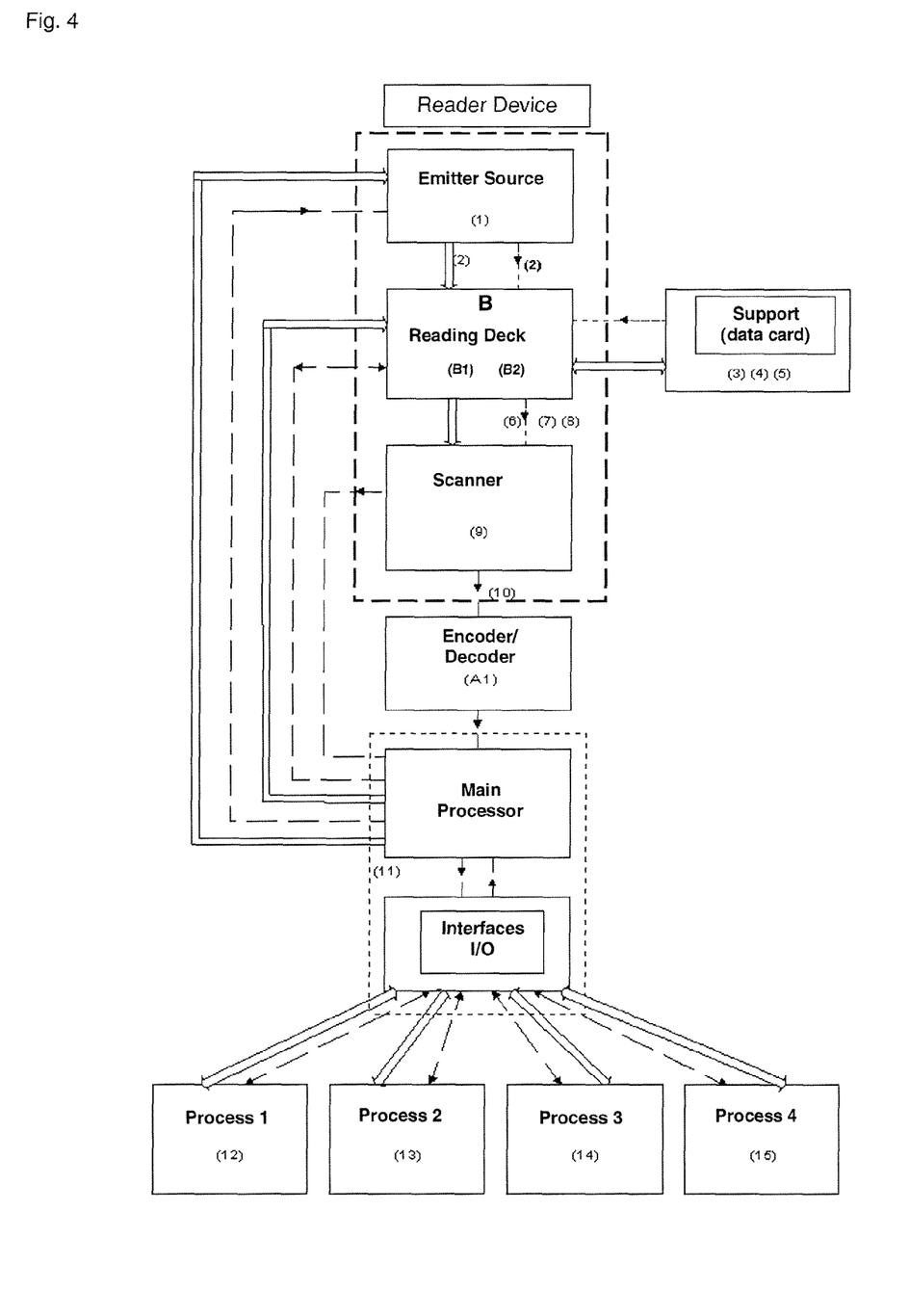
FIG. 4 is a particular block diagram (an application case) which represents the data flows and its interchange between the different blocks of a reading process.

Referring generally to FIG. 4, a block diagram showed a particular case. The dotted line contains the emitter block, the reading deck block and the scanner block, which forms the reader device.
(Note: Numbers refers to FIG. 1)

Figure 5:
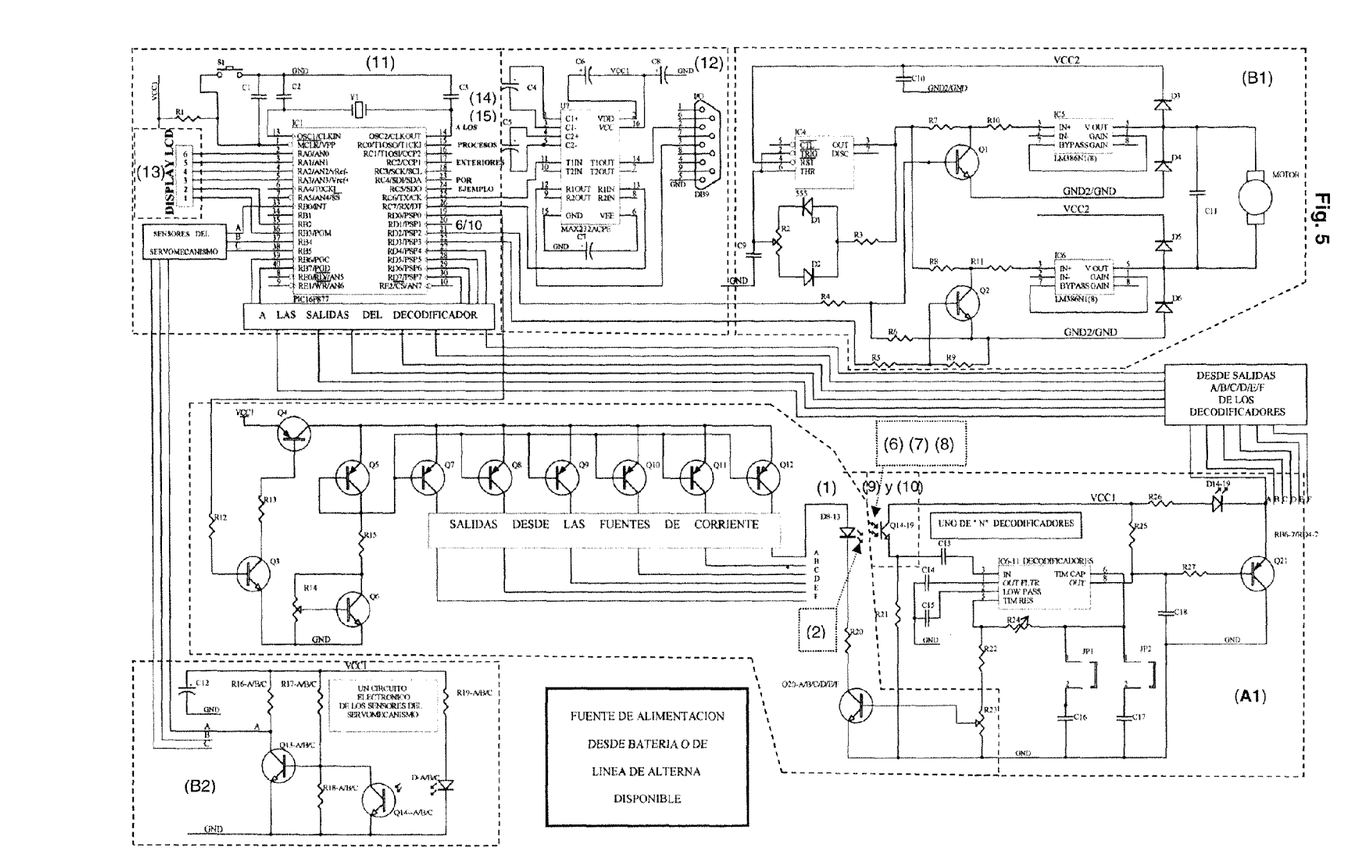
FIG. 5 is a schematic circuit of a reading module in a basic application issue.
Figure 5A:
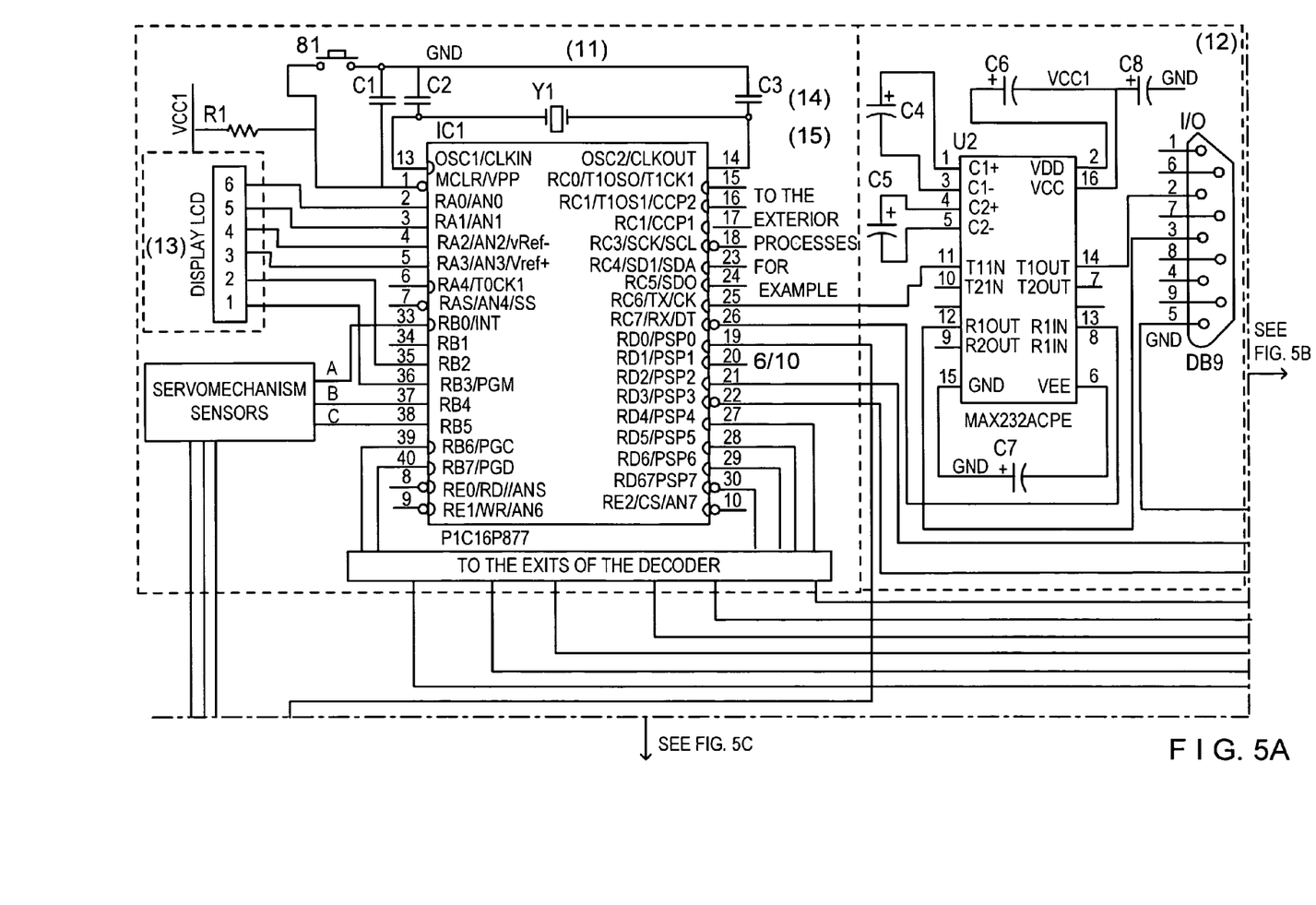
Figure 5B:
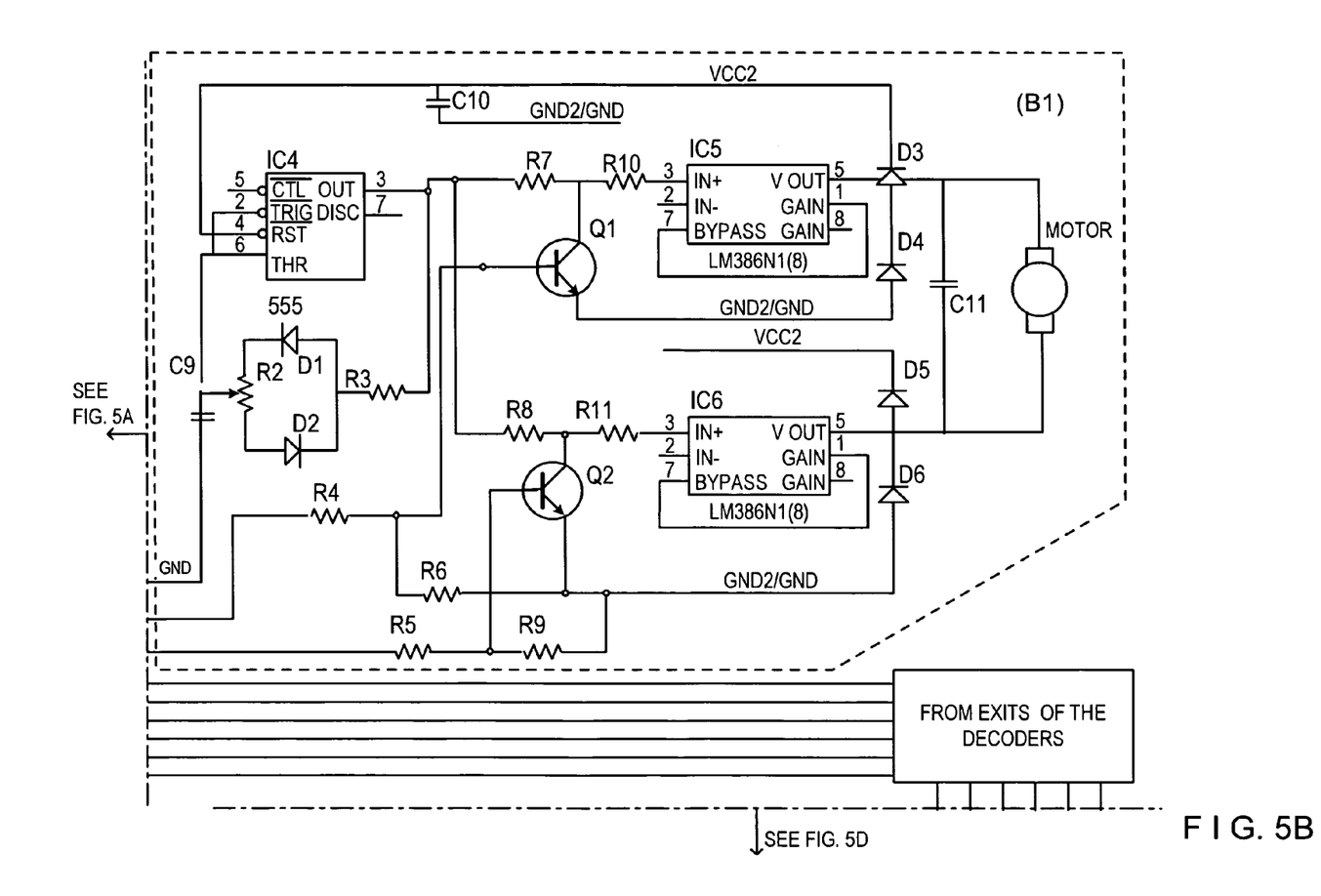
Figure 5C:
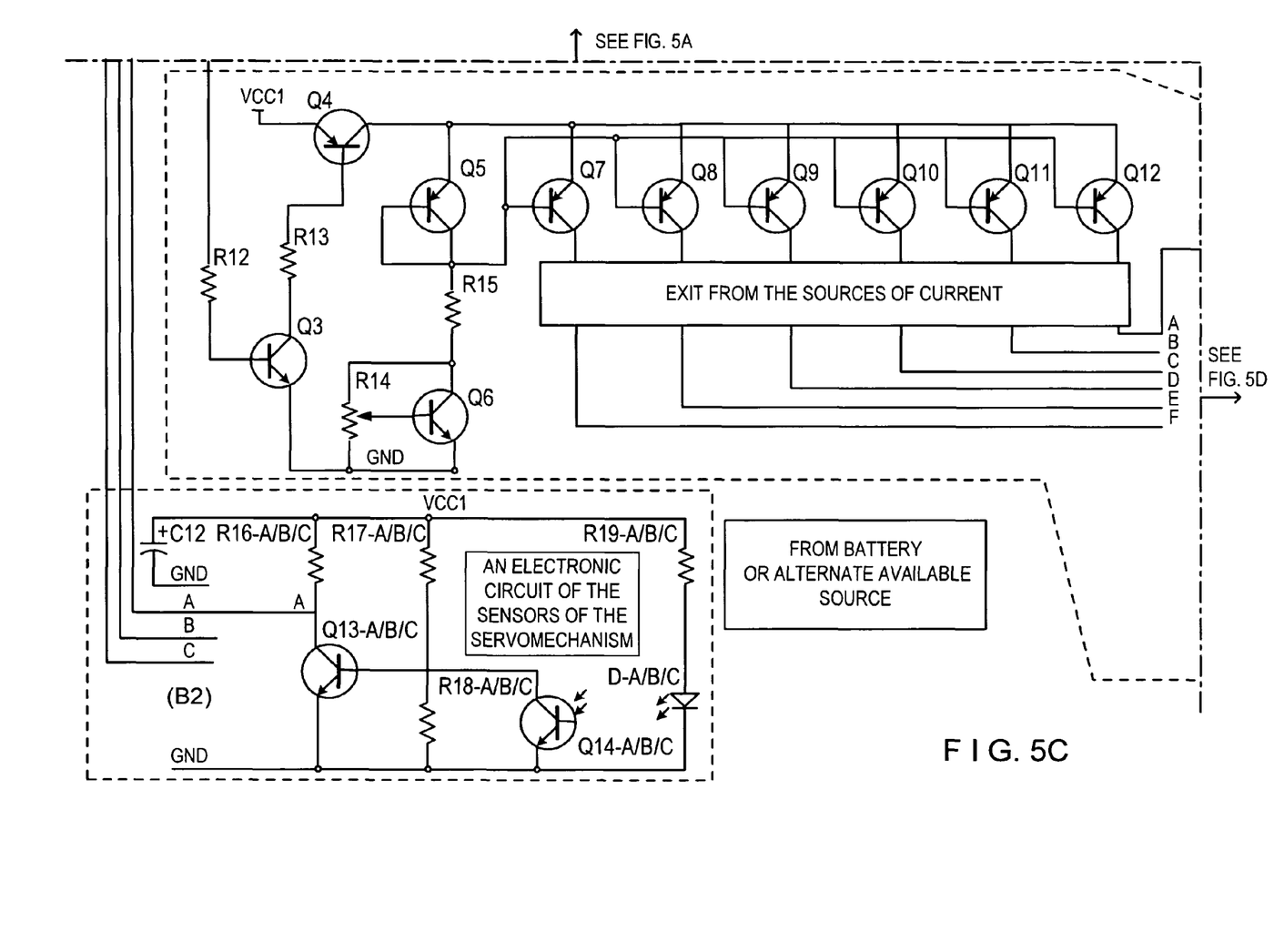
Figure 5D:
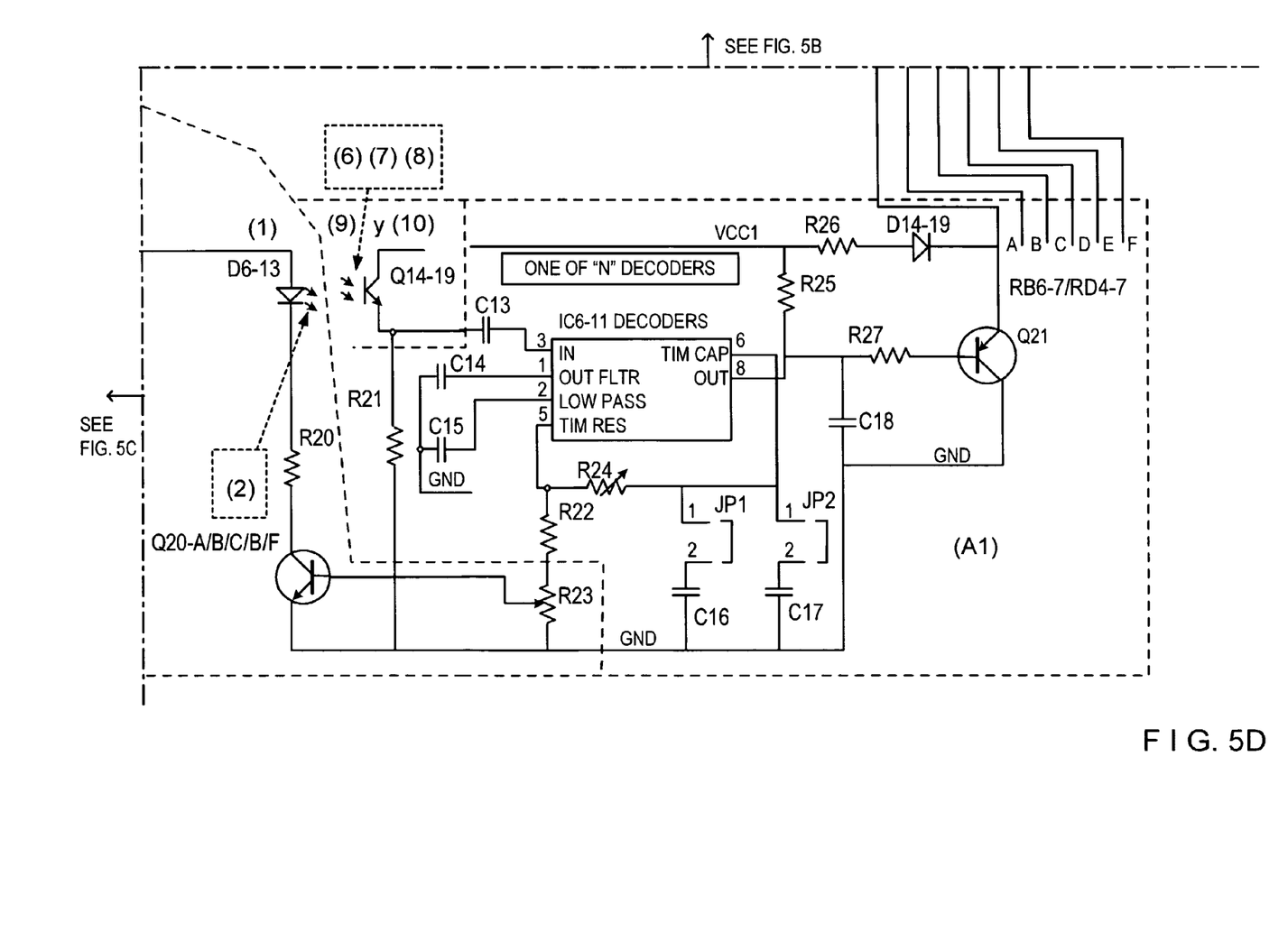

Referring generally to FIG. 5, an schematic circuit illustrates a particular case.
(Note: Numbers refers to FIG. 1)

Figure 6:
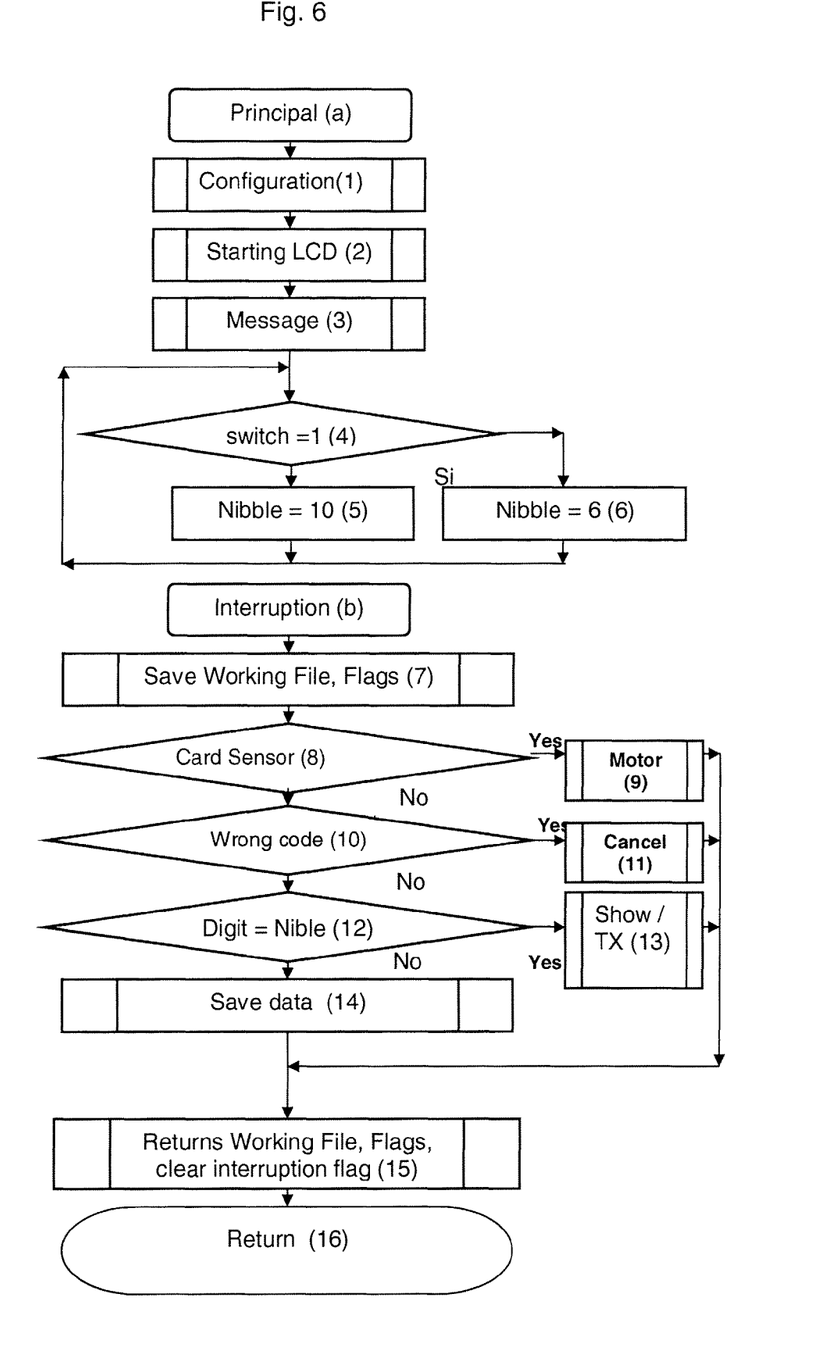
FIG. 6 is a flow diagram of a reading module in a basic application issue.

Referring generally to FIG. 6, a flow diagram shows the validity-testinq logic implemented in a reader device.

What is claimed is:

1. A chromatic printing method, comprising: depositing on a support a layer containing data organized in clusters formed by chromatic deposits, in subtle gradations of chromatics patterns representing encoded data capable of modifying an electromagnetic waveform in controlled and repetitive conditions.

2. An electronic system, comprising: an electromagnetic emitter, a receiver, a transceiver, a microprocessor and interfaces for external devices, said electromagnetic emitter being set at a particular frequency and waveform for bombarding molecules present in clusters formed by chromatics deposits having subtle gradations in chromatic patterns installed at a support, said transmitter being aligned spatially to said receiver; said receiver being locatable to receive emissions from said emitter after interaction with said chromatic deposits; the transceiver being adapted for capturing the biases at the returning waveform level after interaction with said chromatic deposits, the microprocessor being programmed to compare detected frequency and waveform biases to stored sets of parameters for defined chromatic deposits.

3. A system as claimed in claim 2, wherein said emitter is a light emitting diode.

4. A card or support comprising: a layer with chromatic deposits in subtle gradations of chromatics patterns encoding data to be read and decoded by the system as recited claimed in claim 2.

5. A card or support comprising: two or more layers with chromatic deposits in subtle gradations of chromatics patterns encoding data to be read and decoded by the system as recited in claim 2, wherein said layers applied one upon the other give place to physical structures formed by arrangements of pigmented particles.

6. A card or support as claimed in claim 4, wherein the data layer is protected by two non codified layers.

7. A card or support as claimed in claim 4, wherein the card or support is formed from paper.

8. A card or support as claimed in claim 4, wherein the card or support is formed from cardboard.

9. A card or support as claimed in claim 4, wherein the card or support is formed from acetate.

10. A card or support as claimed in claim 4, wherein the card or support is formed from plastic.

11. A card or support as claimed in claim 4, wherein the card or support is formed from rubber.

12. A card or support as claimed in claim 4, wherein the card or support is formed from adhesive tape.

13. A card or support as claimed in claim 4, wherein the card or support is formed from fabric.

14. A card or support as claimed in claim 4, wherein the card or support is formed from plexiglass.

* * * * *

UNITED STATES PATENT AND TRADEMARK OFFICE
CERTIFICATE OF CORRECTION

| | |
|---|---|
| PATENT NO. | : 8,500,020 B2 |
| APPLICATION NO. | : 11/749324 |
| DATED | : August 6, 2013 |
| INVENTOR(S) | : Agustin Jose Luis Perez |

It is certified that error appears in the above-identified patent and that said Letters Patent is hereby corrected as shown below:

On the title page insert item (30),

-- (30) Foreign Application Priority Data
Argentina 2006 0102275 5/31/2006 --.

Signed and Sealed this
Twelfth Day of November, 2013

Teresa Stanek Rea
*Deputy Director of the United States Patent and Trademark Office*